Jan. 5, 1960    P. J. ROBISCHUNG    2,919,522
MACHINE TOOL
Filed May 23, 1958    4 Sheets-Sheet 1

INVENTOR.
PHILIP J. ROBISCHUNG
BY
Woodhams Blanchard & Flynn
ATTORNEYS

Jan. 5, 1960 P. J. ROBISCHUNG 2,919,522
MACHINE TOOL
Filed May 23, 1958 4 Sheets-Sheet 2
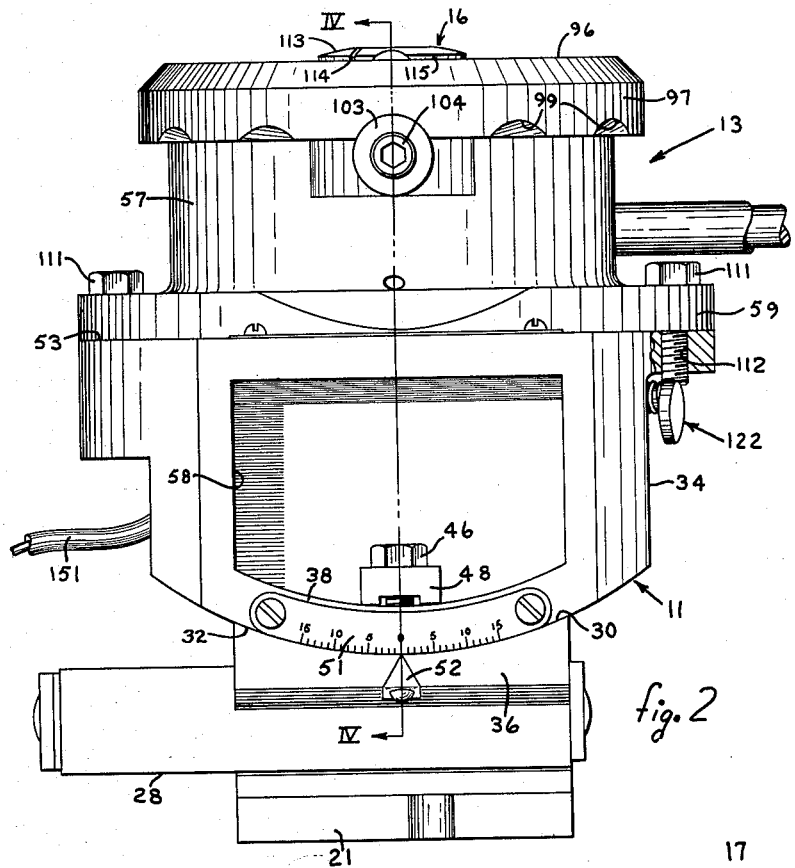
fig. 2
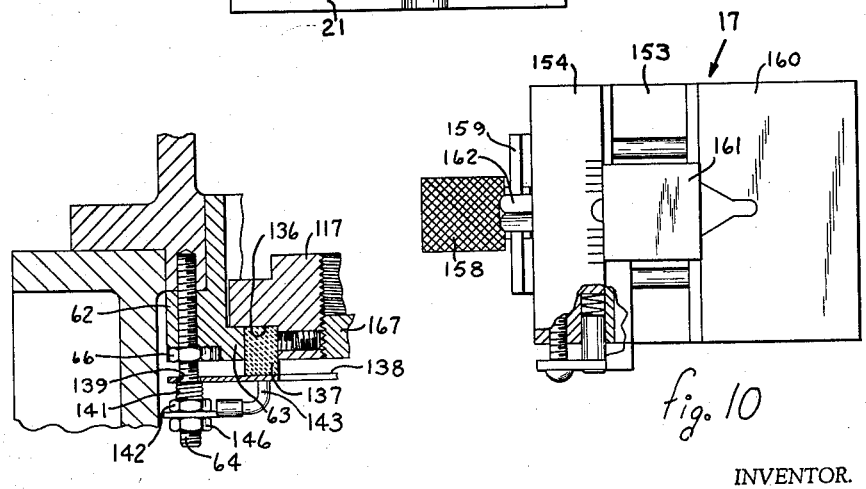
fig. 6
fig. 10
INVENTOR.
PHILIP J. ROBISCHUNG
BY
Woodhams, Blanchard and Flynn
ATTORNEYS

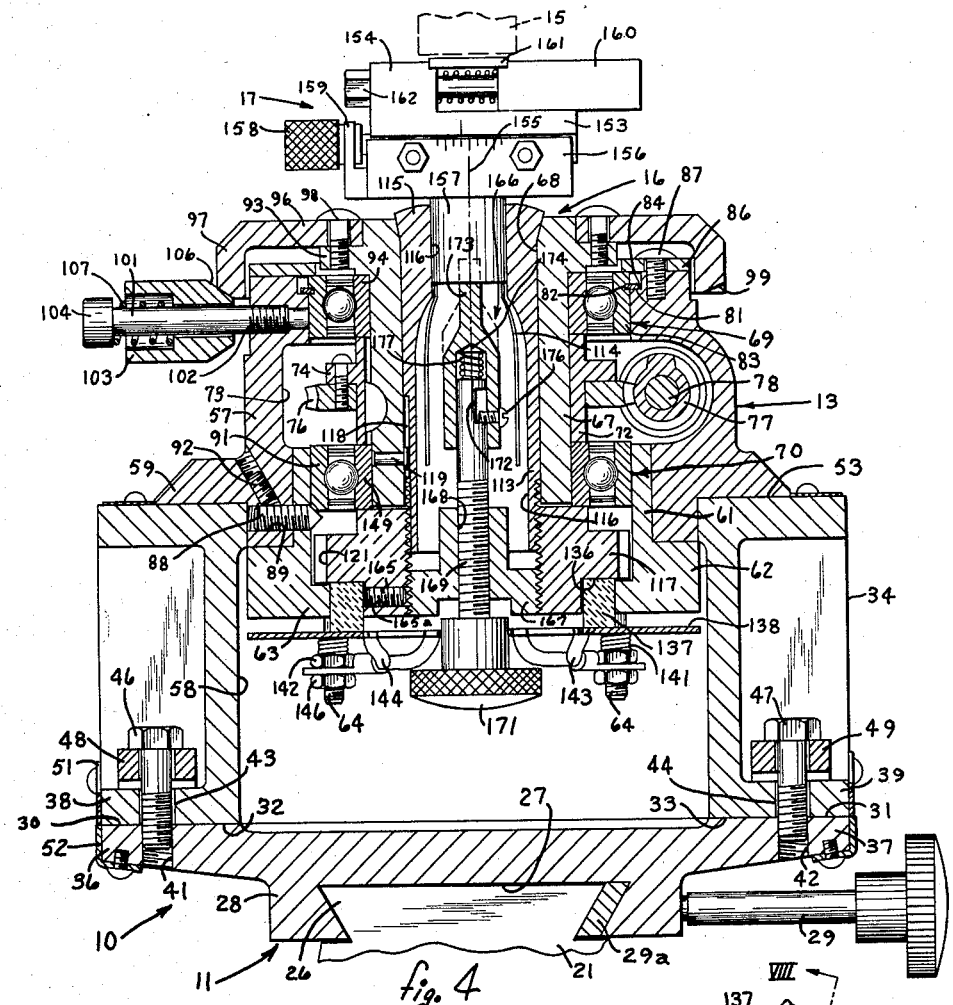
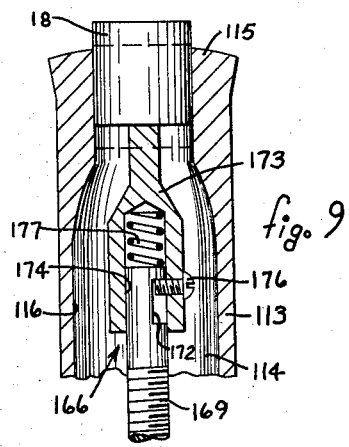
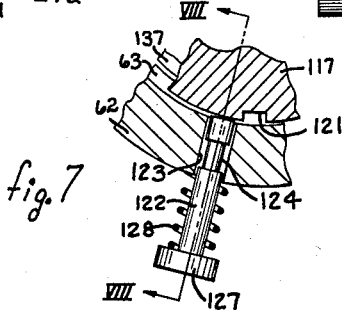
INVENTOR.
PHILIP J. ROBISCHUNG

Jan. 5, 1960 P. J. ROBISCHUNG 2,919,522
MACHINE TOOL
Filed May 23, 1958 4 Sheets-Sheet 4

INVENTOR.
PHILIP J. ROBISCHUNG
BY
Woodhams, Blanchard & Flynn
ATTORNEYS

United States Patent Office 2,919,522
Patented Jan. 5, 1960

2,919,522
MACHINE TOOL

Philip J. Robischung, Kalamazoo, Mich., assignor to Hammond Machinery Builders, Inc., Kalamazoo, Mich., a corporation of Michigan Application May 23, 1958, Serial No. 737,358

7 Claims. (Cl. 51—217)

This invention relates in general to an apparatus mountable upon the work supporting table of an electrolytic grinding machine for positioning and holding a workpiece with respect to the peripheral surface on the grinding wheel thereof and, more particularly, to a type of such apparatus through which the metal removing electrical current can pass with a minimum of losses while permitting a maximum adjustability in the position of the workpiece.

In conducting certain types of grinding operations with an electrolytic peripheral grinder, it is necessary to provide special apparatus, hereinafter also referred to as a vise, for holding and positioning the workpiece. Resurfacing or sharpening quantities of substantially identical, throw-away insert type tool bits, and/or other inserted cutting tools, are examples of such an operation. In order to make these operations profitable, production procedures must be used and this required an apparatus or vise which is capable of quick and easy engagement and release of the workpiece, and which is also capable of placing the workpiece in a wide range of positions. On the other hand, and particularly in small shops, the vise must also be capable of equally effective use in piecework operations covering a wide range of variations. At the same time, the vise must be simple and accurate in operation and inexpensive to produce while requiring a minimum of maintenance, even under severe conditions of use. Existing equipment designed to meet these requirements has not been satisfactory for a variety of reasons.

In some instances, considerable losses have been encountered in conducting current through the vise structure, thereby reducing the effectiveness of, and making erratic, the grinding operation. Attempts to overcome this problem, as by connecting the electrical conductors to the vise near the workpiece, have materially reduced its utility by interfering with its operation.

It is often desirable to perform two or more operations upon each one of a large quantity of similar or identical workpieces. Thus, the vise must be capable of easy and accurate adjustment for operation through a sequence of positions. It has been found difficult to move the tool holding device on present vises for this purpose quickly and easily into a new position and then back precisely into its original position with respect to the grinding surface. Although these problems occur whenever certain types of grinding operations must be performed, they become far more acute where the vise is being used for holding the small, throw-away type bits wherein the effort becomes uneconomical unless it can be accomplished accurately, quickly and easily.

Accordingly, a primary object of this invention is the provision of an apparatus for holding and positioning a workpiece with respect to a grinding surface on the grinding wheel of an electrolytic grinding machine.

A further object of this invention is the provision of an apparatus, as aforesaid, comprising a vise structure having a tool holding device engaged by a positioning unit, whereby said vise can be used with equal effectiveness in performing both production and piecework operations.

A further object of this invention is the provision of a vise structure, as aforesaid, whereby the workpiece can be rotated about a substantially vertical axis by means of at least part of the mechanism utilized in the positioning unit to engage the work holding device.

A further object of this invention is the provision of an apparatus, as aforesaid, whereby successive workpieces can be quickly and positively located in a selected position with respect to a surface on the grinding wheel without readjusting either the positioning unit or the work holding device, and whereby each said workpiece can be moved quickly and easily through the same sequence of selected positions to produce substantially identical results without relocating or readjusting any one of the positions with respect to said grinding surface.

A further object of this invention is the provision of a vise, as aforesaid, which is arranged so that current utilized in the electrolytic grinding operation can pass through the positioning unit and the work holding device with a minimum of losses and variations in electrical potential.

A further object of this invention is the provision of a vise, as aforesaid, which is more simplified in construction, which is easier to operate, which is more accurate in adjustment and which, therefore, is less costly to manufacture and use than existing equipment for the same or similar purposes.

Other objects and purposes of this invention will become apparent to persons familiar with this type of equipment upon reading the following specification and examining the accompanying drawings, in which:

Figure 2 is an end elevational view of the apparatus shown in Figure 1.

Figure 4 is a sectional view substantially as taken along the line IV—IV of Figure 2, and including a tool holding device.

Figure 6 is a sectional view taken along the line VI—VI of Figure 3.

Figure 7 is a sectional view taken along the line VII—VII of Figure 1.

Figure 9 is an enlarged fragment of Figure 4 and including a workpiece.

Figure 10 is a top plan view of the work holding device shown in Figure 4.

Figure 1:
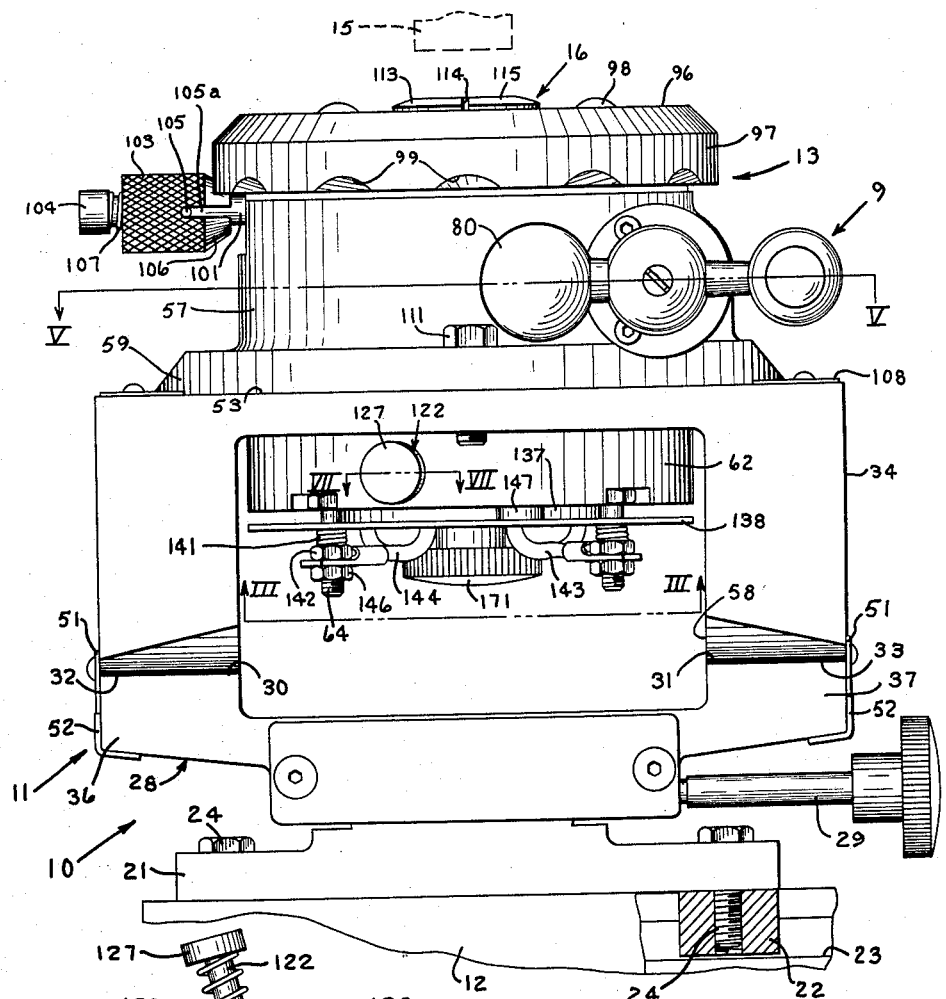
Figure 1 is a side elevational view of an apparatus or vise embodying the invention.

For purposes of convenience in description, the terms "upper," "lower" and derivatives thereof will have reference to the vise structure and parts associated therewith as appearing in Figures 1, 2 and 4. The terms "inner," "outer" and derivatives thereof will have reference to the geometric center of said vise and parts thereof.

General description

In order to meet the objects of this invention, including those set forth above, there has been provided a tool holding and positioning apparatus or vise including a positioning unit mountable upon the work table of a grinding machine, and a work holding device supported upon the positioning unit for holding a workpiece in a selected position with respect to the grinding surface of the grinding wheel on said machine. In this embodiment, said machine is an electrolytic type peripheral grinder. The positioning unit is comprised of a base frame for effecting adjustment of said work holding device in a horizontal direction and, to a limited extent, about a horizontal axis. A head frame, which rotatably supports a collet housing having a collet with a substantially vertical bore, is supported upon the base frame for limited adjustment about the axis of said bore. The means provided for effecting rotation of the collet housing with respect to the head frame serves in part to operate the collet for engaging or releasing the work holding device. Said work holding device includes a pair of jaws adjustably mounted upon a support member. An electrical path is provided from an easily accessible terminal through the collet adjustment mechanism to the collet structure itself for providing an effective path for electrically energizing the work.

Detailed construction

The particular embodiment of the positioning and holding apparatus or vise 10 (Figures 1, 2 and 4), selected to disclose the invention, includes a positioning unit 9 having a base frame 11, which is removably supportable upon the table 12 (Figure 1) of an electrolytic grinding machine having a peripheral grinding wheel 15. A head frame 13, which is mounted upon the base frame 11, rotatably supports a chuck, such as the collet 16, for engaging either a workpiece holding device 17 (Figure 4) or a workpiece 18 (Figure 9).

The base frame 11 includes a mounting plate 21 (Figure 1), which is removably anchored upon said table 12 by means such as the anchor member 22, which is received into a conventional T-shaped groove 23, and the anchor bolts 24. The mounting plate 21 has an upstanding, transverse dovetail 26 (Figure 4), which is received into a corresponding, downwardly opening groove 27 in the cross feed 28. Means such as the manually operable screw 29 and gib 29a (Figure 4) are provided for positively holding the cross feed 28 in a selected position with respect to the mounting plate 21.

The cross feed 28 has a pair of spaced, concave upper surfaces 30 and 31 (Figures 2 and 4) near its opposite ends into which correspondingly curved, downwardly facing convex surfaces 32 and 33 at the opposite ends of the cradle member 34 are snugly and slidably received for effecting pivotal movement of the cradle 34 with respect to the remainder of the base frame 11 about a substantially horizontal axis located above said surface. The concave surfaces 30 and 31 are provided on the flanges 36 and 37 which extend substantially horizontally from the opposite ends of the cross feed 28. The convex surfaces are provided on the flanges 38 and 39 which extend substantially horizontally from the opposite ends of the cradle 34. The flanges 36 and 37 are provided with tapped openings 41 and 42 which are aligned with the circumferentially elongated slots 43 and 44 through the flanges 38 and 39. A pair of bolts 46 and 47 are received through washers 48 and 49 and the slots 43 and 44 for threaded engagement with the openings 41 and 42 for the purpose of releasably holding the cradle 34 in a selected position with respect to the cross feed 28. A pair of pointers 52 (Figure 1) are mounted upon the outer ends of the flanges 36 and 37 of the cross feed 28 and cooperate with a pair of scales 51 mounted upon the adjacent edges of the flanges 38 and 39 (Figure 2) for the purpose of indicating the angle at which a selected part, such as the upper surface 53, of the cradle 34 is disposed with respect to the table 12 upon which the base frame 11 is supported.

The head frame 13 (Figure 4) includes a substantially cylindrical and hollow casing 57 which extends downwardly into the cavity 58 in the cradle 34. Said casing 57 has a substantially concentric and integral flange 59, which extends radially outwardly and slidably engages the said upper surface 53 of the cradle 34. A sleeve 61 having outer and inner flanges 62 and 63 at its lower end is received upwardly into the casing 57 and is secured thereto by the studs 64 and the nuts 66 thereon, said studs 64 extending upwardly through the outer flange 62 (Figure 6).

Figure 5:
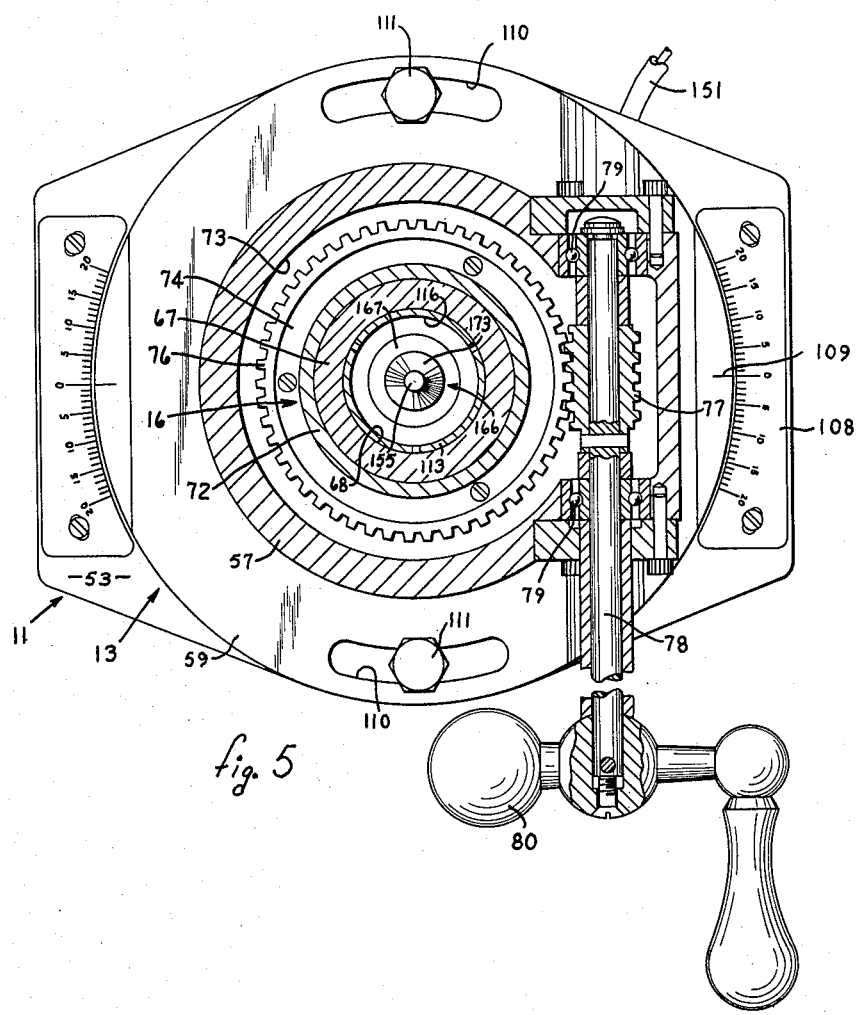
Figure 5 is a sectional view substantially as taken along the line V—V of Figure 1.

A substantially cylindrical collet housing 67 having a substantially coaxial bore 68 is rotatably supported coaxially within the casing 57 by means of the vertically spaced, main bearings 69 and 70. A spacer sleeve 72 snugly encircles the collet housing 67 between the inner races of the bearings 69 and 70 which are disposed on the upper and lower sides, respectively, of the annular compartment 73 in the casing 57. Said sleeve 72 is keyed to the housing 67 and has an external annular flange 74 to which the ring gear 76 is secured. Said ring gear 76 is peripherally engaged by a worm 77 (Figures 4 and 5) on the shaft 78, which is rotatably supported by means of the bearings 79 mounted upon, and within, the casing 57. One end of said shaft 78 extends outwardly away from the casing 57 for engagement by a crank handle 80. Accordingly, rotation of the handle 80 and shaft 78 effects a rotation of the ring gear 76, hence the collet housing 67, about the axis 155 of its bore 68.

A snap ring 81 (Figure 4) is received into an annular groove 82 in the periphery of the outer race 83 of the upper bearing 69 and is engageable with a shoulder 84 at the upper end of the casing 57 for preventing downward movement of the bearing 69 with respect to the casing 57. A cap ring 86, which is secured to the upper surface of the casing 57 by the screws 87, engages the upper surface of the outer race 83 and thereby prevents upward movement of the upper bearing 69 with respect to the casing 57. A lock screw 88, which is threadedly received through a threaded opening 89 through the casing 57 and the sleeve 61, has a tapered inner end engageable with the lower edge of the outer race 91 of the lower bearing 70. The tapered end of the screw 88 permits upward adjustment of the lower bearing 70, and a set screw 92 (Figure 4) holds the lock screw 88 in the desired position.

The collet housing 67 has an outwardly extending, annular flange 93 which engages the upper surface on the inner race 94 of the upper bearing 69. A locating ring 96, having at its periphery a downwardly extending skirt 97, encircles the upper end of the collet housing 67 and is secured, as by means of the screws 98, to the flange 93 on said collet housing. The skirt 97 encircles the cap ring 86 and the adjacent upper portion of the casing 57.

The skirt 97 (Figures 2 and 4) has on its lower edge a plurality of uniformly spaced and radially divergent, conically shaped notches 99. A bolt 101 is threadedly received into a threaded, radially disposed bolt opening 102 in said casing 57 near the lower edge of the skirt 97. A collar 103 is slidably sleeved upon the bolt 101 between the head 104 thereof and said casing 57. Said collar 103 has a conically shaped inner end portion 106 which is snugly and slidably engageable with any one of the conical notches 99. A spiral spring 107, which is sleeved on the bolt 101 between the head 104 and the collar 103, continuously urges said conical portion 106 against the skirt 97. In this embodiment, the notches 99 are arranged at 30° intervals around the skirt 97, but other arrangements may be provided, as desired. A pin 105 (Figure 1) is secured to, and extends radially from, the bolt 101 and is slidably received into the slot 105a in the inner end of the collar 103. This pin and slot arrangement permits axial movement, but prevents rotational movement, between the bolt 101 and collar 103.

At least one scale 108 (Figure 5) is mounted upon the upper surface 53 of the cradle 34 adjacent to the flange 59 for cooperation with a pointer 109 on the flange 59 to indicate the position of the casing 57 with respect to the cradle 34 about the mutual axis of the collet housing 67 and the casing 57. The flange 59 has a pair of circumferentially elongated slots 110 which are located on diametrically opposite sides of the flange and are substantially concentric with the bore 68 of the collet housing 67. Bolts 111 are slidably received through the slots 110

(Figure 5) and are threadedly engageable with threaded openings, such as the opening 112 in Figure 2, through the upper surface 53 of the cradle 34.

The collet 16 includes an axially elongated sleeve 113 (Figure 4) having a plurality, such as three, of uniformly spaced, lengthwise slots 114 (Figure 9) which extend downwardly through the sleeve substantially the same distance from the upper edge thereof. The slots 114 define collet jaws 115, the upper ends of which can be moved toward, and away from, the axis of the collet bore 116 in a substantially conventional manner.

The collet sleeve 113, which is axially longer than the axial extent of the collet housing 67, is externally threaded at its lower end for threaded engagement by an adjustment collar 177. The sleeve 113 (Figure 4) has a lengthwise groove 118 in its external surface into which one end of a guide pin 119 is slidably received, the other end of said pin being firmly secured within the collet housing. The groove 118 and pin 119 prevent rotation of the collet sleeve 113 when the collar 117 is rotated with respect to the housing 67 to effect movement of the collet sleeve.

The external surface of the collet sleeve 113 and the bore 68 of the collet housing 67 are similarly flared at their upper ends in a substantially conventional manner, whereby downward movement of the sleeve 113 effects a reduction in the size of the collet bore 116, particularly near the upper end thereof. In this embodiment, said flaring is arranged so that most of the gripping effected by the collet 16 will occur during a relatively short axial movement of the sleeve 113 with respect to the collet housing 67.

Figure 8:
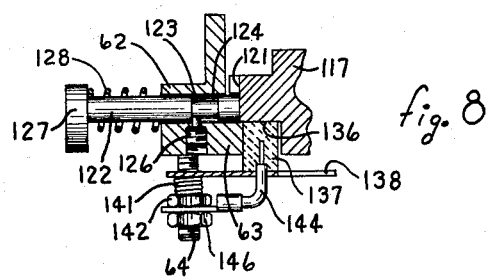
Figure 8 is a sectional view taken along the line VIII—VIII of Figure 7, and rotated about 80° clockwise.

As shown in Figures 7 and 8, the adjustment collar 117 has a plurality of spaced notches 121 in its periphery and a detent pin 122 slidably extends through a radially disposed detent opening 123 in the sleeve 61 for reception into any one of the notches 121. The detent pin 122 has in its outer surface an annular recess 124 which is of substantial axial extent and into which the inner end of a set screw 126 (Figure 8) is receivable for limiting the axial movement of the detent pin 122 with respect to the sleeve 61. Said detent pin 122 has a head 127 on its outer end and a spiral spring 128 is sleeved upon the pin 122 between the head 127 and the adjacent surface of the sleeve 61, whereby said pin 122 is continuously urged out of engagement with the adjustment collar 117, as shown in Figure 7.

Figure 3:
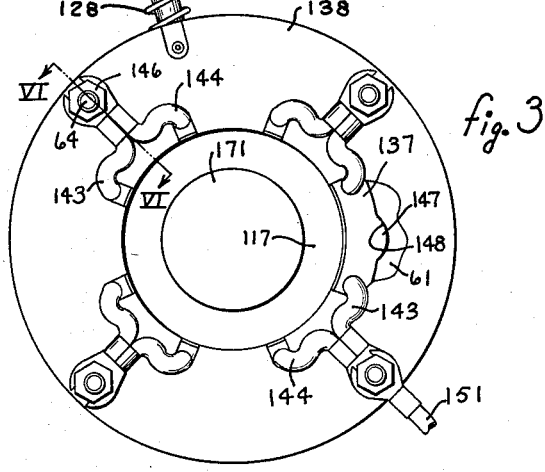
Figure 3 is a sectional view substantially as taken along the line III—III of Figure 1.

The lower surface of the adjustment collar 117 is provided with a coaxial annular notch 136 into which the terminal or slip ring 137 is received for slidable engagement with said adjustment collar 117. A relatively flat pressure ring 138 is disposed adjacent the lower side of the collar 117 and has a plurality of openings 139 (Figure 6), through which the studs 64 are slidably received when said pressure ring is substantially coaxial the terminal ring 137. Said pressure ring 138 is resiliently urged upwardly against the terminal ring 137 by spiral springs 141 which are sleeved upon the studs 64 and held under compression against said pressure ring 138 by the nuts 142. Each stud 64 is connected by a pair of conductors 143 and 144 (Figure 3) to the terminal ring 137 (Figure 8). An outer nut 146 on each stud 64 holds said conductors against the inner nut 142. The periphery of the terminal ring 137 has a plurality of radial projections 147 (Figure 3) which are snugly receivable into corresponding recesses 148 in the inner flange 63 on the lower end of the sleeve 61, thereby preventing relative rotation of the terminal ring 137 with respect to the sleeve 61. The spiral springs 141, operating through the pressure ring 138 and the terminal ring 137, urge the adjustment collar 117 upwardly against the inner race 149 of the lower main bearing 70. One or more of the studs 64 may be connected to a conductor 151 (Figures 2 and 3).

The tool holding device 17 (Figures 4 and 10), which is supported by the positioning unit 9, may be comprised of a support member 156 having a support post 157 slidably receivable into the bore 116 of the collet 16. A jaw plate 153, having a lower jaw 154 at one end thereof, is slidably supported upon the support member 156 for movement transversely of the central axis 155 of the support post 157 by means including the adjustment screw 158. The screw 158 is rotatably supported upon, and held against axial movement by, a bracket 159 (Figure 10) which is mounted upon the support member 156. An upper jaw 160 is slidably supported upon the jaw plate 153 for movement with respect to the lower jaw 154 by means of the control screw 162. The support member 156, the jaw plate 153 and the upper jaw 160 are preferably arranged so that a workpiece 161 held within the jaws 154 and 160 can be accurately centered with respect to the axis 155 of the support post 157. Thus, the workpiece is automatically centered also with respect to the rotational axis of the collet 16, which is coincident with the axis 155. The control screw can be operated to engage or release a workpiece 161 without disturbing the adjustment of the holding device 17.

In order to facilitate removal of means, such as the workpiece 18 or the support post 157, from within the bore 116 of the collet 16, an ejection device 166 (Figures 4 and 9) is provided. Said device 166 includes a support ring 167 which is externally threaded for threaded reception into the lower end of the adjustment collar 117. The support ring 167 is releasably held against rotation within the collar 117 by a set screw 165 which is threadedly received into a radially disposed, threaded opening 165a in the collar 117. Said support ring 167 has a coaxial threaded bore 168 for threaded reception of the screw 169 which has a manually engageable knob 171 secured to its lower end and a lengthwise, closed end groove 172 near its upper end. An ejection cap 173 has an elongated recess 174 into which the upper end of the screw 169 is slidably received for movement lengthwise thereof. A set screw 176 extends through the cap 173 into the groove 172 for limiting movement of said cap axially of the screw 169. A spiral spring 177 is disposed within the recess 174 and held under compression between the blind end of said recess and the upper end of the screw 169. Accordingly, the cap 173 can be depressed by the post 157 as it enters the collet 16, whereby said cap is moved down into the solid line position shown in Figure 4. However, as soon as the collet 16 releases its grip upon the post 157 said cap 173 moves into its broken line position thereby ejecting the post 157 from within said collet. The ejection device 166 is particularly useful where the relatively small workpiece 18 (Figure 9) is held directly within the collet 16 and, therefore, is difficult to remove by manual engagement.

The parts of the device are either made from noncorrosive material or are plated to resist corrosion by the electrolyte used in the grinding operation. Where plating is used, it is, of course, carried out prior to assembly of the device in order to insure complete coverage of all parts.

*Operation*

Where the positioning apparatus or vise 10 (Figure 1) is being used in conjunction with a peripheral type grinder, the positioning unit 9 is usually mounted upon the table 12 so that the pivot axis of the cradle 34 is substantially parallel with the rotational axis of the peripheral grinding wheel 15. The positioning unit 9 is also located upon the table 12 so that the bore 116 of the collet 16 is properly and radially aligned with said grinding wheel 15. The mounting plate 21 of the base frame 11 is then secured to the table 12 by means such as the anchor 22, which is received into the groove 23, and the anchor bolts 24.

When the holding device 17 is used, the support member 156 is mounted upon the positioning unit 9 by inserting the support post 157 into the collet 16. If the bore 116 of the collet 16 is not large enough to receive the post 157, such bore is enlarged by appropriate depression of the pin 122 and rotation of the shaft 78. That is, the detent pin 122 is pressed against the periphery of the collar 117, which normally rotates with the collet housing 67, so that the inner end of the pin 122 drops into the first notch 121 in the periphery of said adjustment collar 117 which it encounters and thereby prevents rotation of the adjustment collar 117 with respect to the casing 57. The worm 77 is now rotated by the crank handle 80, whereby the collet housing 67 and the collet 16 are rotated about the axis 155 of the collet. This produces a relative rotation between the collet 16 and the adjustment collar 117. Due to the threaded engagement between the collet 16 and the adjustment collar 117, such relative rotation between these two elements effects an axial movement therebetween. Because of the flared, engageable surfaces at the upper ends of the sleeve 113 and collet housing 67, downward movement of the collet sleeve 113 with respect to the collet housing 67 will cause the bore 116 of said collet 16 to contract.

If it is desired to open the collet, upward movement of such collet must be effected by the appropriate rotation of the worm 77. The support post 157 (Figure 4), for example, may now be inserted into the collet bore 116, after which the shaft 78 and worm 77 are rotated in the opposite direction, so that the collet sleeve 113 is moved downwardly by the collar 117. This closes the collet 16 and causes it to grip the post 157, after which the guide pin 119 is released. The spring 128 causes the detent pin 122 to move out of the notch 121 in which it is seated, thereby freeing the adjustment collar 117 to again rotate with the collet housing 67.

The adjustment screw 29 on the cross feed 28 is loosened so that said cross feed, as well as the structure including the device 17 supported thereon, can be moved transversely of the groove 27 into the desired position with respect to the grinding wheel 15. The cross feed 28 is then fixed in position with respect to the mounting plate 21 by tightening the adjustment screw 29. The attitude of the cradle 34, hence the head frame supported thereon, is now adjusted about a substantially horizontal axis by loosening the bolts 46 and 47 and simultaneously moving the flanges 38 and 39 with respect to the flanges 36 and 37, respectively, after which said bolts 46 and 47 are tightened.

The jaws 154 and 160 of said device 17 are now positioned so that they will receive a workpiece 161 preferably with the center thereof located along the rotational axis 155 of the collet 16. The conductor 151 is connected in a conventional manner to a source of electrical energy, not shown, and the positioning apparatus 10 is ready for final, precise adjustment.

Because the collet 16 rotates while it is engaging the post 157 on the device 17, for example, the workpiece 161 held by the device 17 (Figure 4) is not likely to be in the desired position with respect to the grinding wheel 15 when the engagement is complete. The adjustment is made by rotating the crank handle 80, which operates through the shaft 78, the worm 77 and the ring gear 76 to rotate the collet housing into any position throughout a 360° angle. Having thus positioned the device 17 with respect to the grinding wheel 15, it usually develops that the conical portion 106 on the collar 103 is not aligned with one of the conical notches 99 on the skirt 97. In circumstances where it is unnecessary to rotate the workpiece 161 around the axis 155 of the collet 16 in order to perform a series of operations thereon, this lack of alignment between the collar 103 and a notch in the skirt 97 may be disregarded.

Where it is desirable to rotate each workpiece through several positions, the collar must then be aligned initially with one of said notches. This is accomplished by turning the crank handle 80 and thereby rotating the collet housing 67 until the conical portion 106 is received into one of the conical notches 99. The bolts 111 through the flange 59 are then loosened so that the entire head frame 13 can be rotated with respect to the cradle 34 about the axis 155 until the device 17 or workpiece 161 is properly aligned with the grinding wheel 15. Because the casing 57 is sleeved within the cradle 34, the rotation of the head frame 13 is around the axis 155 of the collet 16. The amount of such rotation can be accurately checked on the scale 108. The bolts 111 are again tightened and the positioning apparatus 10 is now in condition for operation.

It will be noted that the conical notches 99 in the skirt 97 are sufficiently close together that engagement of at least one of said notches by the conical portion 106 of the collar 103 can be effected within the limits of the slots 110 and the scale 108. Further, by appropriate selection or reselection of such conical notch 99, complete 360° adjustment of the head frame 13, hence of the workpiece 161, can be effected with respect to the cradle 34 around the axis 155 of the collet 16. That is, it is possible with the positioning apparatus 10 to position a workpiece 161 in any angular position, which may be desired or required around the rotational axis of the collet 16, without loosening the device 17 within the collet 16. At the same time it is possible to have the initial position of the workpiece 161 accurately identified by engagement between the collar 103 and one of the conical notches 99. It will be recognized that the positioning and number of the conical notches 99 may be as desired or required within the concept of the invention. In this particular embodiment, such conical notches 99 are located at 30° intervals around the periphery of the skirt 97 and, accordingly, the slots 110 permit at least a 30° movement of the head frame 13 with respect to the cradle 34 about the axis 155 of the collet 16. Further, the scales 108 are capable of reflecting accurately the extent of such movement.

During an operation wherein a plurality of workpieces 161 (Figure 4) must each be cycled through a plurality of positions to perform duplicate grinding operations, the collar 103 serves to accurately position the device 17 and/or workpiece 161 in each of such sequential positions and return the workpiece to its original position with respect to a grinding wheel 15. Thus, when the workpiece 161 is replaced in said device 17 with a similar workpiece, no further adjustments are required so long as the device 17 is capable of holding each successive workpiece in the same position.

Such rotational sequencing of the collet 16 and workpiece 161 held therein is easily effected by turning the handle 80 and thereby rotating the worm 77 and ring gear 76. Disengagement of the collar 103 from one of the conical notches 99 and subsequent rotation of the collet housing 67 can be effected by rotating the crank handle 80. However, the collar 103 can be manually grasped and urged radially outward from the casing 57 thereby permitting unobstructed movement of the collet housing 67 about its axis. The collar 103 is continuously urged against the edge of the skirt 97 by means of the spring 107.

When it becomes desirable to release the device 17 from the positioning unit 9, the detent pin 122 is again pressed into one of the notches 121 in the periphery of the adjustment collar 117, after which the handle 80 is rotated in the proper direction to effect a release of the support post 157 from the collet 16. The cap 173, due to the urging of the spiral spring 177, will eject the post 157 as soon as such release is effected.

It will be seen that the terminal ring 137 will provide a positive and continuous contact with the adjustment collar 117 throughout all of the adjustments and movements of the parts supported and included in the head frame 13. Further, the threaded connection from the collar 117 to the collet 16 will insure good electrical contact in all adjusted positions of the parts.

Although a particular preferred embodiment of the invention has been disclosed in detail hereinabove, it will been understood that variations or modifications of such disclosure, which lie within the scope of the appended claims, are fully contemplated.

I claim:

1. An apparatus for holding and positioning a workpiece with respect to the grinding wheel of an electrolytic grinder, comprising: a base frame securable in a fixed position with respect to the axis of the grinding wheel; a head frame supported upon said base frame for movement about a second axis; electrically conductive, tool engaging means rotatably supported upon said head frame and mechanism for rotating said engaging means about said second axis; an electrically conductive, annular member slidably and coaxially engageable with said tool engaging means; electrically conductive, resiliently backed means supported upon said head frame and urging said annular member against said engaging means; and stop means supported upon said head frame and engageable with said tool engaging means for positively positioning same with respect to said head frame.

2. In a tool holding and positioning apparatus for use with an electrolytic grinder having a grinding wheel, comprising: a frame structure; and electrically conductive chuck rotatably supported within said frame structure and means for effecting rotation of said chuck; an electrically conductive, annular member coaxially engaging said chuck near one axial end for adjusting the size thereof, adjustment being effected by rotation of said annular member with respect to said chuck; an electrically conductive slip ring coaxial with, and slidably engaging, said annular member; resiliently backed means supported upon said frame and urging said slip ring against said annular member; means on said frame preventing rotation of said slip ring with respect to said frame; and stop means on said frame selectively engageable with said annular member for preventing rotation of said member with respect to said frame structure, whereby rotation of said chuck effects a change in the size thereof.

3. An apparatus for holding and positioning a workpiece with respect to the grinding wheel of an electrolytic grinder having a work supporting table, comprising: a base structure adjustably engageable with said table; a head frame supported upon said base structure for movement about a substantially vertical axis; an electrically conductive collet rotatably supported within, and upon, said head frame and means for effecting rotation of the collet about said axis and with respect to said head frame; an electrically conductive adjustment collar threadedly engaging said collet, relative rotation between said collar and said collet effecting an operation of said collet; an electrically conductive terminal ring coaxially and slidably engageable with the lower surface of said adjustment collar; means holding said terminal ring non-rotatable with respect to said head frame; resiliently backed means supported upon said head frame and urging said terminal ring against said adjustment collar; stop means on said head frame selectively engageable with said collar for preventing rotation of said collar with respect to said head frame, whereby rotation of said collet effects an adjustment in the opening size of said collet; and a tool holding device engaged by said collet.

4. The structure of claim 3 wherein said collet includes a housing having a circular flange overlying said head frame, said flange having a plurality of uniformly spaced notches in the peripheral portion thereof; and detent means supported upon said head frame and removably receivable into said notches for positively positioning said collet with respect to said head frame.

5. The structure of claim 3 wherein said base frame includes a base plate removably secured upon said table, a cross slide adjustably supported upon said base plate for substantially horizontal movement transversely thereof, and a cradle adjustably supported upon said cross slide for movement about an axis spaced above said cross slide and extending in a direction substantially perpendicular to the direction of movement of said cross slide.

6. The structure of claim 3 wherein said resiliently backed means includes a circular plate coaxially engaging the lower surface of said terminal ring, a plurality of studs extending through said circular plate and threadedly engaged with said head frame, a spiral spring encircling each stud and means on said stud holding said spring in compression against said plate; and wherein electrical conductors connect said terminal ring to said studs.

7. The structure of claim 3 including an annular member threadedly and coaxially received into the lower end of said adjustment collar, an adjustment rod threadedly received through said annular member substantially coaxial with said collet, an ejection head supported upon the upper end of said rod for limited movement axially thereof, and resilient means urging said head axially away from said rod.

References Cited in the file of this patent

UNITED STATES PATENTS

| 2,103,074 | Gardner | Dec. 21, 1937 |
| 2,385,198 | Engle | Sept. 18, 1945 |
| 2,746,917 | Comstock | May 22, 1956 |
| 2,764,543 | Comstock | Sept. 25, 1956 |
| 2,772,232 | Comstock | Nov. 27, 1956 |
| 2,778,794 | Comstock | Jan. 22, 1957 |
| 2,783,199 | Comstock | Feb. 26, 1957 |
| 2,805,197 | Thibault et al. | Sept. 3, 1957 |
| 2,815,435 | Adcock | Dec. 3, 1957 |

FOREIGN PATENTS

| 637,872 | Great Britain | Apr. 8, 1948 |
| 854,224 | France | Apr. 8, 1940 |